United States Patent [19]
Coleman et al.

[11] Patent Number: 6,006,971
[45] Date of Patent: Dec. 28, 1999

[54] TRUCKBED TOOLBOX SYSTEM

[76] Inventors: Charles R. Coleman, 2601 Valencia, Bellingham, Wash. 98226; Robert J. Coleman, 1625 Mapleton, Dallas, Tex. 75228

[21] Appl. No.: 09/124,622

[22] Filed: Jul. 29, 1998

[51] Int. Cl.$^6$ .............................. B60R 9/00; B60R 9/042; B60P 1/64
[52] U.S. Cl. .......................... 224/404; 224/310; 224/281; 224/282; 296/37.6; 414/498; 414/537; 359/841; 359/844; 280/748
[58] Field of Search .................................. 224/404, 310, 224/281, 282; 414/498, 537; 280/748, 749; 296/37.6, 24.1, 3; 359/841, 844

[56] References Cited

U.S. PATENT DOCUMENTS

| | | | |
|---|---|---|---|
| D. 345,650 | 4/1994 | Boyd | D12/423 |
| D. 374,654 | 10/1996 | Steketee | D12/423 |
| 3,757,972 | 9/1973 | Martin | 414/537 |
| 3,826,529 | 7/1974 | Wood | 296/37.6 |
| 4,249,684 | 2/1981 | Miller et al. | 224/42.4 |
| 4,350,257 | 9/1982 | Groth et al. | 220/4 F |
| 4,522,326 | 6/1985 | Tuohy, III | 224/404 |
| 4,967,944 | 11/1990 | Waters | 224/273 |
| 5,052,737 | 10/1991 | Farmer, Jr. | 296/39.2 |
| 5,121,959 | 6/1992 | King | 296/37.6 |
| 5,224,531 | 7/1993 | Blohm | 144/285 |
| 5,368,357 | 11/1994 | Kalis, Jr. et al. | 296/183 |
| 5,382,069 | 1/1995 | Chambers | 296/37.6 |
| 5,398,987 | 3/1995 | Sturgis | 296/37.6 |
| 5,419,476 | 5/1995 | White | 224/273 |
| 5,518,158 | 5/1996 | Matlack | 224/402 |
| 5,622,299 | 4/1997 | Berard | 224/403 |
| 5,634,577 | 6/1997 | Pearson, Jr. et al. | 224/242 |

*Primary Examiner*—Linda J. Sholl
*Attorney, Agent, or Firm*—Christopher J. Whewell

[57] ABSTRACT

Provided herein is a toolbox system especially well suited for use on pickup trucks. The system provides quick and easy access to a wide variety of tools which may be contained in the toolboxes. The assemblies are modular and are readily loaded and unloaded from the bed portion of a pickup truck. An increased degree of safety and convenience is realized from use of the devices herein set forth.

15 Claims, 9 Drawing Sheets

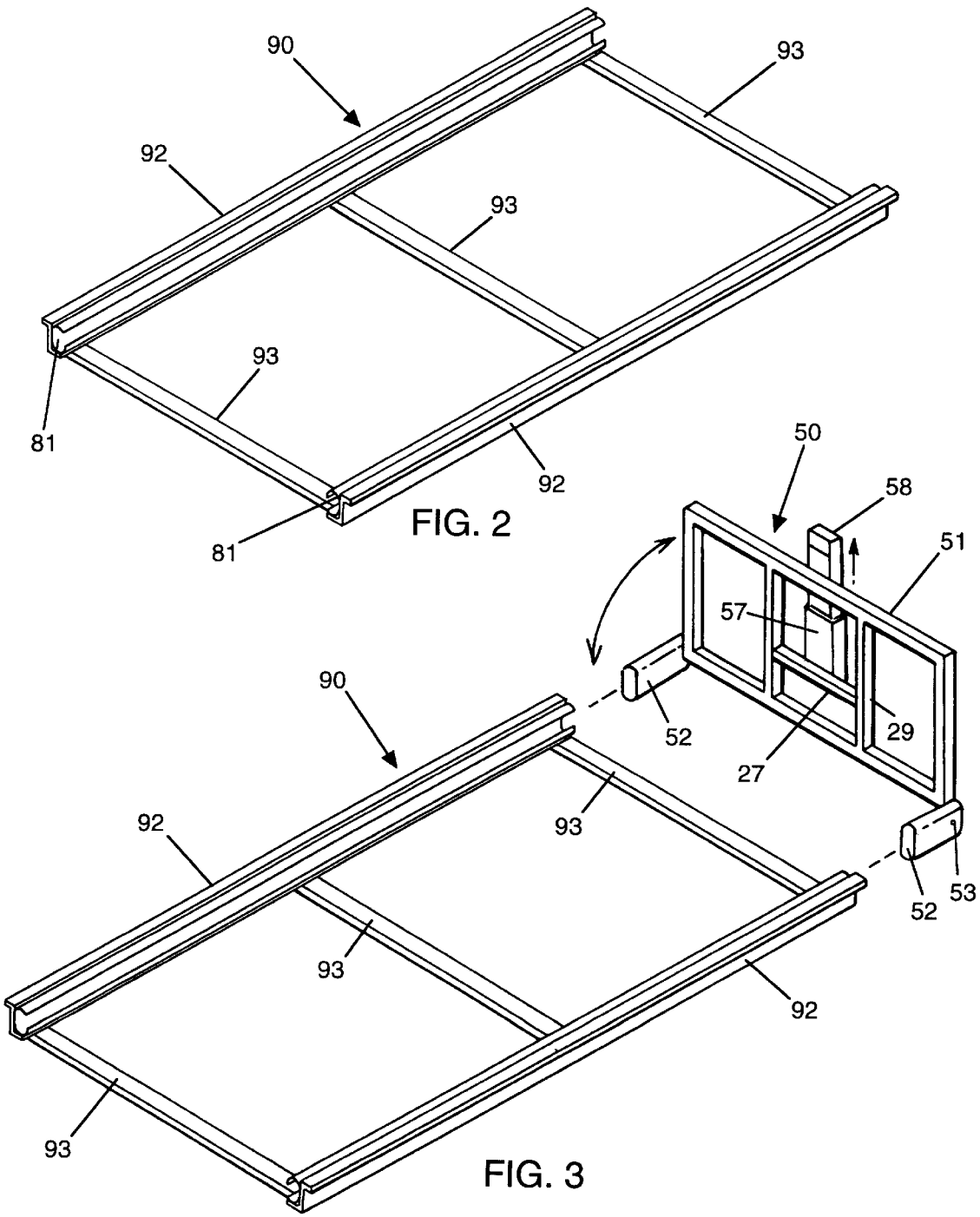

TRUCKBED TOOLBOX SYSTEM

BACKGROUND INFORMATION

1) Technical Field

This invention relates to a toolbox system especially adapted for use by workpersons employing pickup trucks and the like for performance of various trades and/or workings. The toolbox systems disclosed herein are designed to be housed in the bed portion of a typical pickup truck.

2) Description of Related Art

Pickup trucks have been attractive as work vehicles since their initial appearance in the marketplace. Many workpersons have found them especially convenient for assisting in caddying tools, implements, and the like for the various trades in which they are employed, including plumbers, painters, electricians, mechanics, etc. Tradespersons engaged in these and other professions have found it desirable to have tool boxes mounted in the truck bed area, behind the operator's cab. Generally, the tool boxes are intended to organize and restrain tools and other items that would otherwise be free to move about the truck's bed area.

The prior art provides a wide variety of toolboxes adaptable for use in the bed of a pickup truck. For example, U.S. Pat. No. 5,634,577 describes an open bottom crossover toolbox insert; U.S. Pat. No. 5,419,476 discloses a truck toolbox locking door plate; U.S. Pat. No. 5,398,987 describes a toolbox assembly for use in the bed of a pickup truck; U.S. Pat. No. D345,650 discloses an automotive toolbox; U.S. Pat. No. D374,654 sets forth a truck mounted toolbox; U.S. Pat. No. 5,518,158 teaches a pickup truck tailgate toolbox assembly; U.S. Pat. No. 5,382,069 sets forth a hideaway door for truck beds in which tools may be housed; U.S. Pat. No. 5,368,357 describes a utility truck body having option attachment components for attaching toolboxes or the like; U.S. Pat. No. 5,224,531 describes a portable tool caddying device which is readily maneuvered into the bed of a pickup truck; U.S. Pat. 5,121,959 describes a slide mount for pickup truck tool boxes; U.S. Pat. No. 5,052,737 describes an attachment for securing a toolbox to a pickup truck; U.S. Pat. No. 4,967,944 describes a truck tool box of unitary construction; U.S. Pat. No. 4,350,257 sets forth a kit for assembling a toolbox adapted for installation in the back of a pickup truck; and U.S. Pat. No. 4,249,684 sets forth a removable toolbox adapted for use in a pickup truck bed, to name but a few.

By far the most popular type of toolbox which is commonly seen located within the bed of a pickup truck is the crossover toll box. The crossover toolbox is so named because of its physical orientation with respect to the rectangular truck bed. The crossover toolbox is normally oriented across the bed of a pickup truck, from one side to the other. Frequently the crossover tool box is located directly behind the rear window of the operator's cab, and the toolbox normally has one or more lids transversely hinged with respect to the longitudinal length of the box. In the case of a single box lid, its length will extend across the truck bed and be hinged at one end adjacent to the side of the bed. In such configuration, the entire lid must be raised to access the tools inside the box. In the case where a plurality of lids are employed, for example, two lids, each is normally hinged in a back-to-back configuration, one to the other at the middle of the box. In this configuration, the lid has a length that is equal to one-half or less of the width of the truck bed, and permits the user to lift the lids independently from the sides of the truck.

It is a necessary requirement of truck mounted tool boxes in general to restrain work implements and other items from free motion caused by inertial forces normally present under conditions encountered by moving motor vehicles, while at the same time containing a provision for convenient access by the workpersons desiring to employ the tools at a given time. The toolbox must also, in general, have a reasonable capacity for holding tools, be durable, and possess a reasonable degree of eye appeal, i.e., they should be aesthetically pleasing.

One problem associated with truck tool boxes of the prior art is gaining access to a specific item within the tool box without having to remove other various and sundry items that may be either on top of the desired item or obscuring it from view. One attempt at resolving this problem is the provision of sliding drawers that are used to compartmentalize the interior of the toolbox, examples of solutions being disclosed in U.S. Pat. Nos. 4,789,195 and 4,844,305. However, many pickup truck tool boxes of prior art are non-compartmentalized, and access to specific items contained therein may not easily be made without removal of various items in order to provide access to the desired item.

It is common for a pickup truck to be parked in the street, at the curb position while workpersons undertake a task at hand. For the workman desiring to extract a tool which is located in such a position to only be accessible to one standing along the side of the pickup truck which is near moving traffic, the worker must expose themselves to the dangers inherently present to being in close proximity with moving vehicles. Therefore, an additional problem associated with prior art toolboxes intended for mounting in the beds of pickup trucks is the lack of safety provisions for workpersons desirous of accessing the various implements contained in the toolbox from the street. This is especially true when the implement to be removed from the truck is large, bulky, or awkward, since the worker must in general lift the item to an elevated level, which in turn requires cautious leveraging if one is to maintain control over one's person, as well as balance. Compounding the hazard is the potential for injury to the spine from such required awkward leveraging.

Clearly then, a toolbox adaptable for use in the bed of a pickup truck which is capable of permitting rapid and convenient access to a large number of tools while minimizing safety hazards to its users is highly desirable. It is therefore an object of this invention to provide a tool caddying device for use in the bed of a pickup truck which is capable of containing a large number of tools, which tools are easily accessible by a workman regardless of the position of the workman with respect to the pickup truck when the pickup truck is in a parked position. It is a further object of this invention to provide a frame adapted for use in the bed of a pickup truck which is capable of accepting a plurality of different toolbox modules which may be readily inserted into said frame and conveniently accessed by a workman at an appropriate time. These and other objects will become apparent to one of ordinary skill in this art after thoroughly reading and understanding this specification and the claims appended hereto.

SUMMARY OF THE INVENTION

The present invention provides a new and improved method of accessing tools by workmen who choose to use the pickup truck as the means of transportation and containment of the implements they use on a regular basis. However, the system of this invention is readily adapted to other conveyances in addition to pickup trucks.

Generally speaking, the present invention comprises a toolbox system adapted to reside atop or in a motor vehicle.

The toolbox is ergonomically designed, and is rotatable about a central vertical axis so as to provide quick and convenient access by a person in a stationary position to all of the compartments contained within the toolbox. The toolbox is compartmentalized, and each compartment may be conveniently and readily removed by the user. Additionally, the toolbox as a whole may be easily removed from the pickup truck or other conveyance on or in which it is transported. Such provision permits rapid exchange of the entire contents of the rotating toolbox, which is desirable in a variety of trades.

The caddying apparatus for use in conjunction with various implements according to this invention comprises a rectangular frame assembly attached preferably to a pickup truck. The rectangular frame assembly is defined as comprising two parallel long support rails on its long side, and two parallel short support rails on its short side, where the long support rails have portions interior and exterior to said rectangular frame assembly. Also included are a pair of linear track portions having open channel portions along their length and having open ends adapted to receive at least one rolling element, said linear track portions affixed to the interior portion of each of said long parallel support rails such that the open channel portion of each of said linear track portions are facing one another. A rotational mount assembly including a circular track portion having an interior portion and an exterior portion is included where the circular track portion has a continuous open channel on its interior portion and a plurality of slots for receiving a plurality of rolling means. The circular track portion is attached to and surrounded, on a common plane, by a substantially square outer framework wherein each leg member of the square has inner and outer surfaces and wherein the outer framework includes a plurality of rolling elements disposed on two of its opposite outer surfaces. The axis of rotation of the rolling elements is essentially perpendicular to the common plane shared by the circular track portion and the square outer framework. A modular container assembly, preferably box-like in shape comprises an upper and a lower surface wherein the lower surface is flat and has a plurality of rolling means attached to it in such orientation to permit simultaneous insertion of said rolling means into the plurality of slots. Such an arrangement confers rotational capability to the modular container with respect to the rectangular frame assembly, while permitting easy removal of the modular container assembly by sliding the rotational mount assembly out from the open ends of the linear track portions.

BRIEF DESCRIPTION OF THE DRAWINGS

FIG. 2 is a perspective view of the rectangular frame assembly;

FIG. 3 is a perspective view of the rectangular frame assembly further comprising the swing-up cab-guard assembly in its "up" position;

DETAILED DESCRIPTION OF PREFERRED EMBODIMENTS

Figure 1:
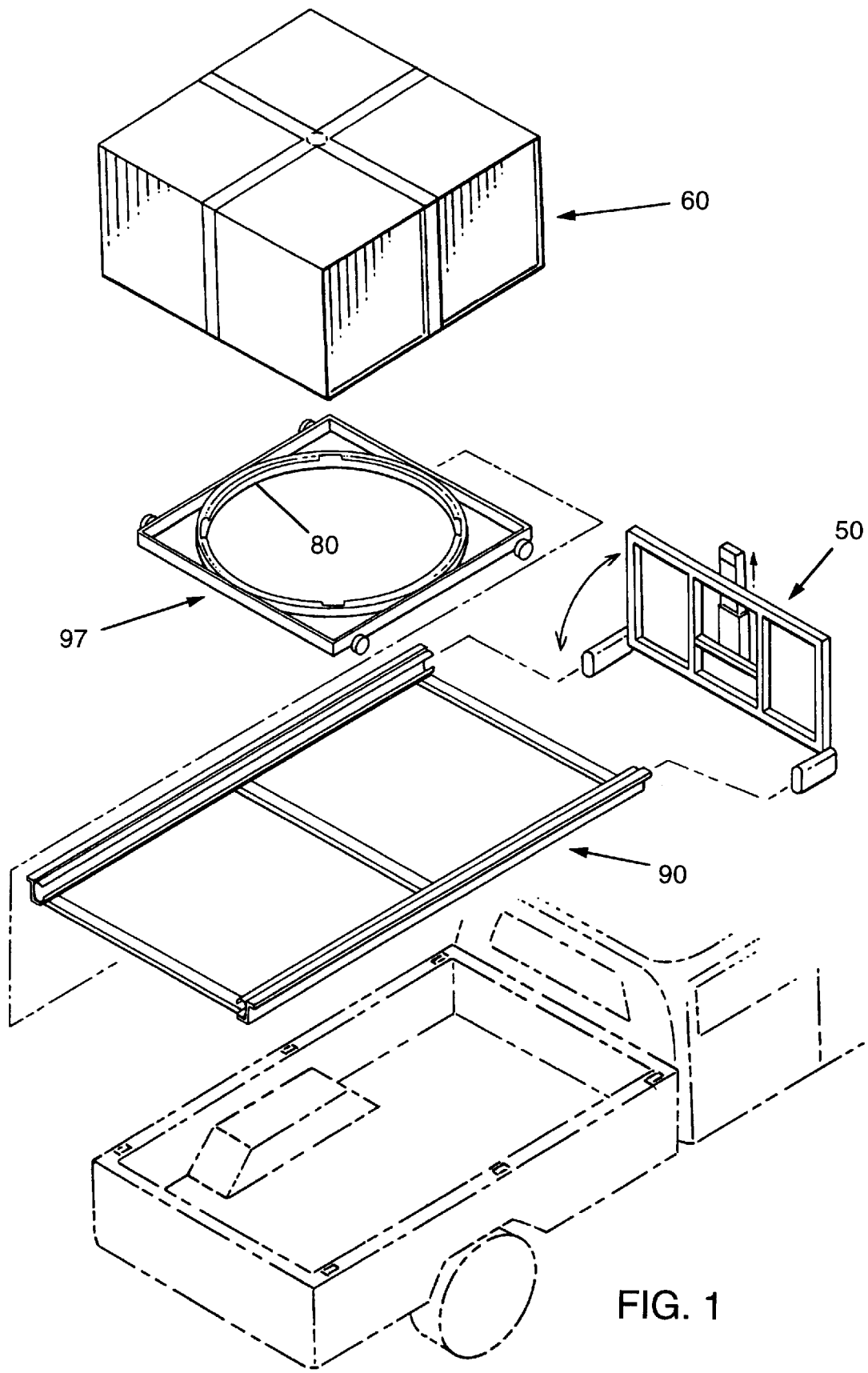
FIG. 1 is an exploded perspective view of the components of the invention.

Referring to the drawings and initially to FIG. 1 there is illustrated a tool-caddying device in accordance with the principles of the present invention. Therein are depicted a rectangular frame assembly 90, a preferred swing-up cab-guard assembly 50, a wheeled rotational mount assembly 97 and a rotating modular container assembly 60, all shown in relation to a pickup truck upon which they are mounted. In general terms, the cab-guard assembly is attached to the rectangular frame assembly 90, and the combination of these elements is securely fastened to the topmost surface of the bed of a pickup truck in the orientation shown. Rotational mount assembly 97 is mounted within rectangular frame assembly 90 by virtue of casters or rolling wheels at the outer edges of rotational mount assembly 97 being inserted into the grooves of rectangular frame assembly 90. Finally, modular container assembly 60, which preferably comprises one or more toolboxes, is rotatably attached to circular track portion 80 to provide a rotatable toolbox system mounted to the pickup truck. Using such an arrangement, it is possible to provide a toolbox system for adaptation to a pickup truck wherein the toolbox is both rotatable to permit easy access by a stationary workman irrespective of his position about the bed of the pickup truck, and removal and substitution of the toolbox as a whole.

Depicted in FIG. 2 is a truck bed liner rectangular frame assembly 90 made according to this invention. This element comprises parallel long support rails 92 and parallel short support rails 93. The installation rails include round C-track portions 81 which are attached to parallel long support rails 92. The round C-track portions are complementary to the size of the rolling elements 86 which are a part of the square outer framework 84 (FIG. 6) to be inserted therein. Although this type of mating is the most preferred form of the instant invention, other functionally-equivalent means are contemplated as being useful for this purpose herein including various wheel or slot arrangements which are complementary to one another and similarly functionally slidable. The angle iron portions are preferably z-shaped in cross section to provide for easy mounting to the bed of a pickup truck to which the whole shall rest, and to provide a nesting position for the C-shaped installation rails to reside securely. Conventional fastening means (not shown) are employed to fasten the C-shaped rails to the angle iron portions and may include, but are not limited to screws, rivets, bolts, welds, and braces.

FIG. 3 depicts a more preferred embodiment of a rectangular frame assembly 90 which comprises parallel long support rails 92, parallel short support rails 93, and a swing-up cab guard assembly 50 attached to the frame assembly. The presence of the cab guard is for safety purposes to shield the operator of the vehicle from the toolbox assembly in the unlikely event that the toolbox or any portion of it should become dislodged from its moorings and be caused to move suddenly toward the vehicle cab under the influence of inertial forces. The cab guard assembly consists of a frame portion 51, and insert portions 52 which are designed to fit inside the linear track portions 81. After being slid into the open ends of the C-track portion, the inserts are secured by conventional fastening means which may consist merely in a pin being inserted through common holes in each member, aligned with one another. Provided at the junction of the inserts 52 and the frame 51 on each side of the cab guard assembly are hinge pins 53 which provide for the rotation or swinging up of the cab guard assembly as indicated by the arrow in FIG. 3. Cross supports 29 add strength to the frame 51 and also provide a mounting point for crossmember 27 to which is affixed the periscope. Also included as part of the cab guard assembly is housing portion 57 which is machined in a complementary fashion to that of telescoping portion 58 to permit the free vertical motion of telescoping portion 58, as well as a spring, as is more fully described in FIG. 18. The guard assembly is equipped with a periscope located in telescoping portion 58 and its housing 57 which provides for uninhibited rear-view mirror sight, and the periscope and its housing are each provided with a complementary means for permitting the locking in place of the periscope in position, such as, for example, matching holes in each capable of being aligned and locked in place simple insertion of a pin through their walls when the holes in each are in alignment.

Figure 4:
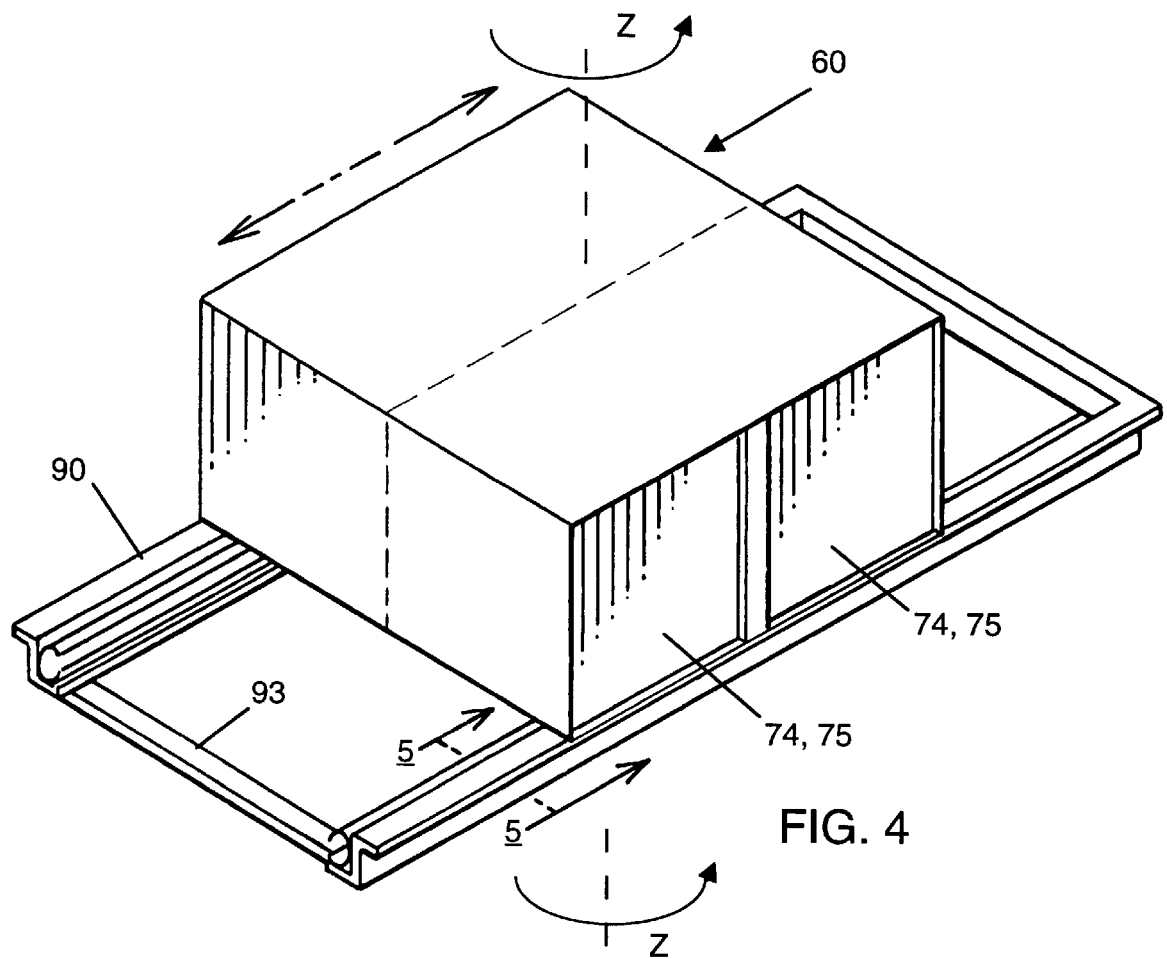
FIG. 4 is a perspective view of the rectangular frame assembly showing a modular container assembly in its normal position.
Figure 5:
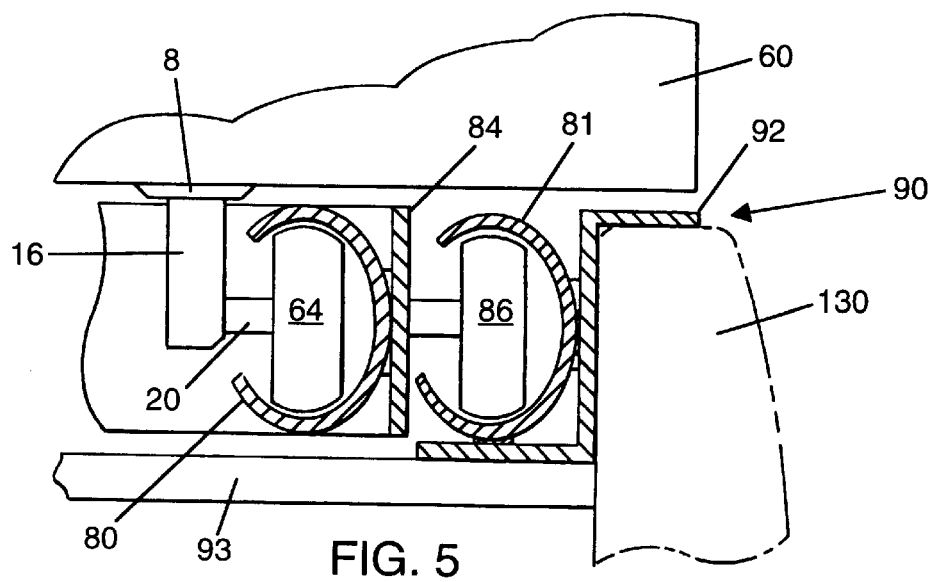
FIG. 5 is an enlarged detail view showing the rectangular frame assembly, C-track portions, and rolling means attached to truck bed wall as shown in section 5—5 of FIG. 4.

FIG. 4 sets forth the relationship of a modular container assembly 60 resting upon the rectangular frame assembly 90. Also shown within the modular container assembly 60 are doors 74 and 75 behind which tools or other objects may be housed in a toolbox or plurality of drawers, compartments or the like which are well-known to those in the art. Modular container assembly 60 is equipped with a plurality of casters on its underside, as depicted in FIG. 5. Preferably, the underside of the toolbox is equipped with four such casters, mounted equidistantly from one another in a pattern and spacing which matches the opening slots 83 of the circular track portion 80 shown in FIG. 6. Such an arrangement permits ease in affixing the toolbox to the square outer framework 84.

Figure 7:
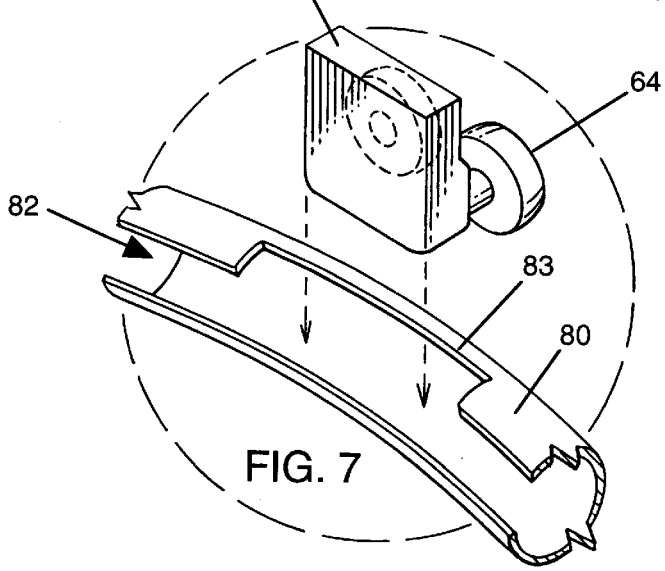
FIG. 7 is an enlarged detail showing the support wheel slot opening for installation of the modular container assembly into the round C-track taken from detail circle 7 in FIG. 6.

FIG. 5 shows the means by which modular container assembly 60 is rotatably attached to the frame assembly. Shown affixed to the bottom of the modular container assembly 60 by conventional means preferably including a vertical bar 16, horizontal bar 20, and mounting flange 8 is a rolling means 64 which resides in circular track portion 80 (as shown in FIG. 7) attached to square outer framework 84. Such an arrangement permits rotation of the toolbox as a whole upon the square outer framework 84 about the z-axis shown in FIG. 4, and hence within the back of the pickup truck to which the apparatus as a whole is mounted, to permit ease of access by a tradesman irrespective of his position with the bed of the truck. Also attached to square outer framework 84 is rolling element 86, which is in turn housed within linear track portion 81 to provide for the sliding of the modular container assembly 60 in and out of the pickup truck on an as-needed basis. Also shown for convenience is a portion of the truck bed 130.

Figure 6:
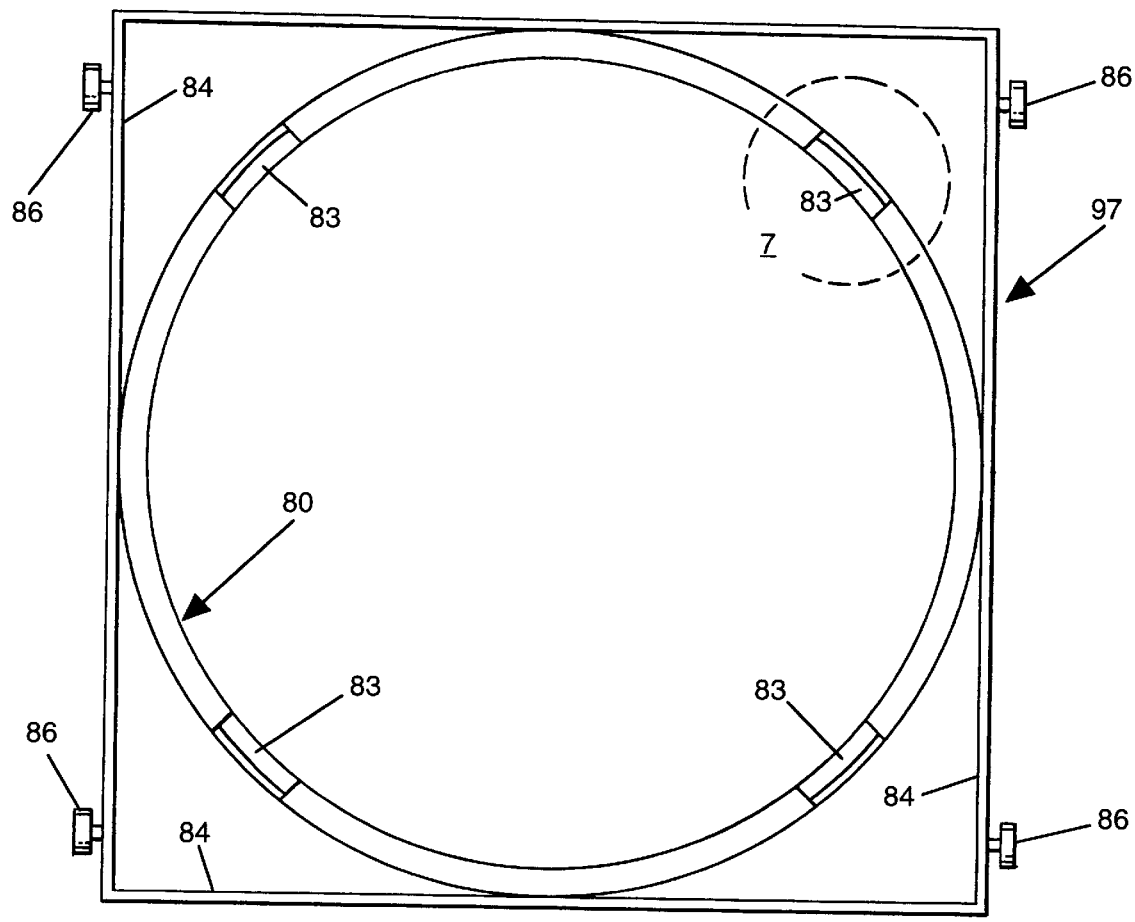
FIG. 6 is a top plan view of the rotational mount assembly.

FIG. 6 is a top view showing the relationship between the various elements of the rotational mount assembly 97 including the square outer framework 84, rolling elements 86, and circular track portion 80 having slots 83 therein which allow for insertion of the rolling means 64 from the toolbox portion thereinto. The construction of all parts are preferably metallic to ensure a long service life. However, other structural composites are herein contemplated as being useful in this capacity, provided they are of sufficient structural strength to not buckle or otherwise give in under loads encountered during conditions of normal usage.

FIG. 7 shows the way in which a rolling means 64 which is attached to the underside of modular portion 62 is inserted into the circular track portion 80 by means of the slots 83 provided in circular track portion 80.

Figure 8:
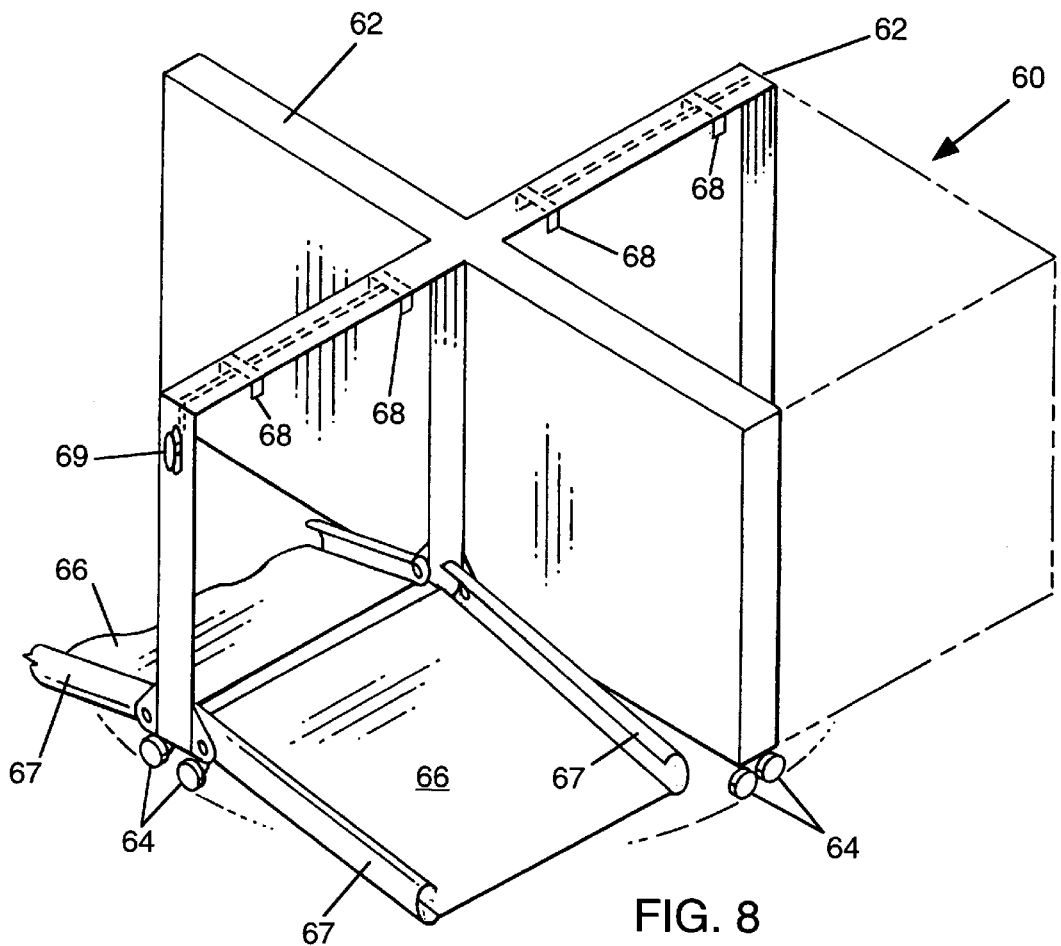
FIG. 8 is a perspective view of the modular container assembly showing two of the drop-down container ramps.

FIG. 8 depicts the preferred toolbox of this invention showing removable modular container assembly 60 including its modular frame 62, rolling means 64, drop-down container ramp 66, C-track 67, closure fastener male portions 68, and release and lock handle 69. Herein, each modular container assembly 60 is readily removed from the assembly as a whole by a workman either at any location by merely actuating lock handle 69 to release the modular container assembly 60 thus causing hinged ramp portion 66 to swing slightly downwards, and permitting the modular container assembly 60 to be slid out from the modular assembly as a whole in a quick and convenient way.

Figure 9:
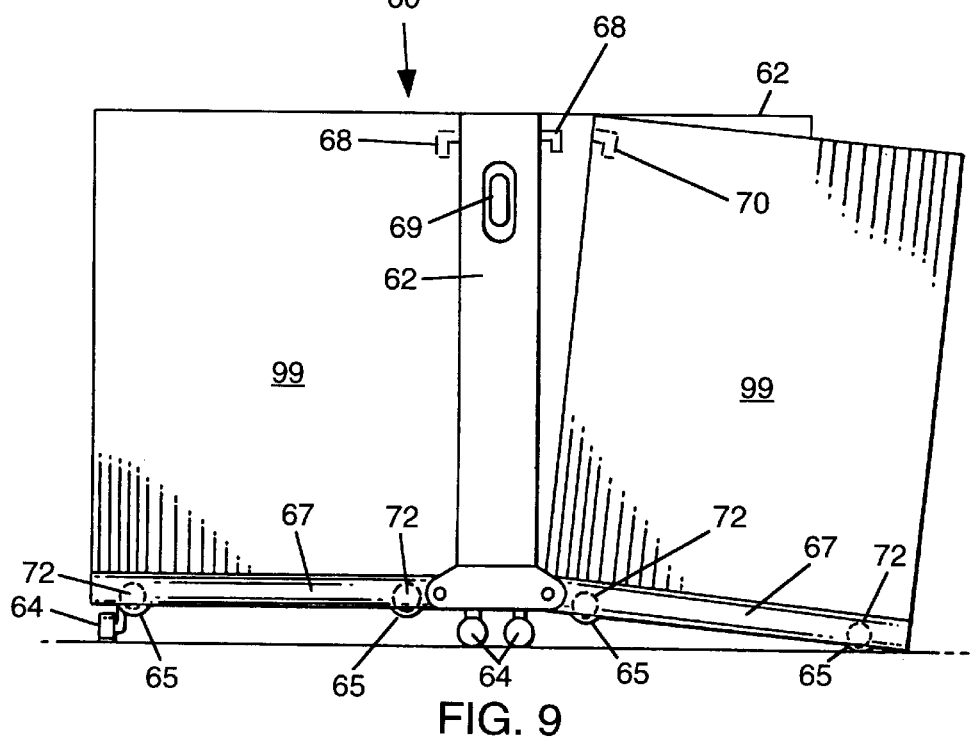
FIG. 9 is a rear view of the modular container assembly showing a container assembly subcombination in a position ready to be either rolled up or rolled off.

FIG. 9 shows a different view of the relationship between the various elements of FIG. 8, in particular showing how casters 72 which are mounted to the modular container assembly 60 slidably fit into the C-track 67, as well as the preferred location of the means by which locking in place of a storage compartment 99 is accomplished by the sliding closure portions 68 actuated by lock handle 69 fitting into matching grooves in modular container assembly 60.

Figure 10:
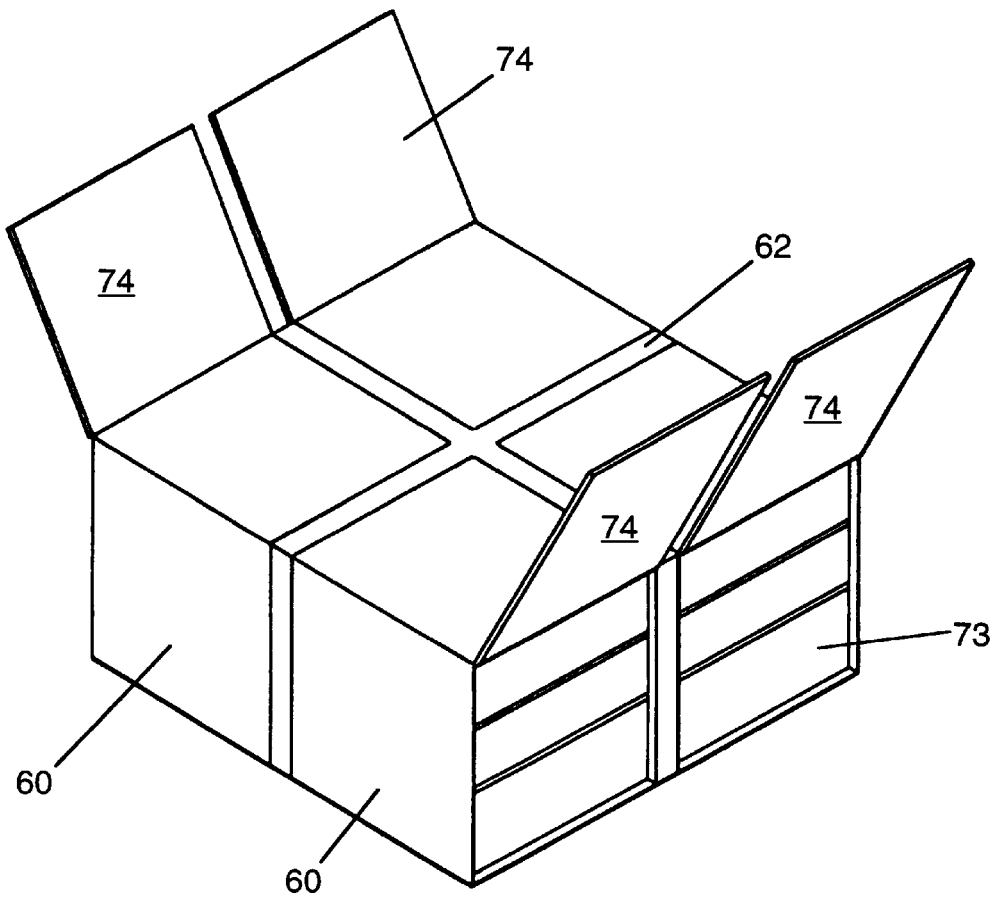
FIG. 10 is a perspective view of the modular container assembly that contains a variety of stowage drawer.

FIG. 10 shows a typical container assembly according to this invention having hinged doors 74 and container drawers 73.

Figure 11:
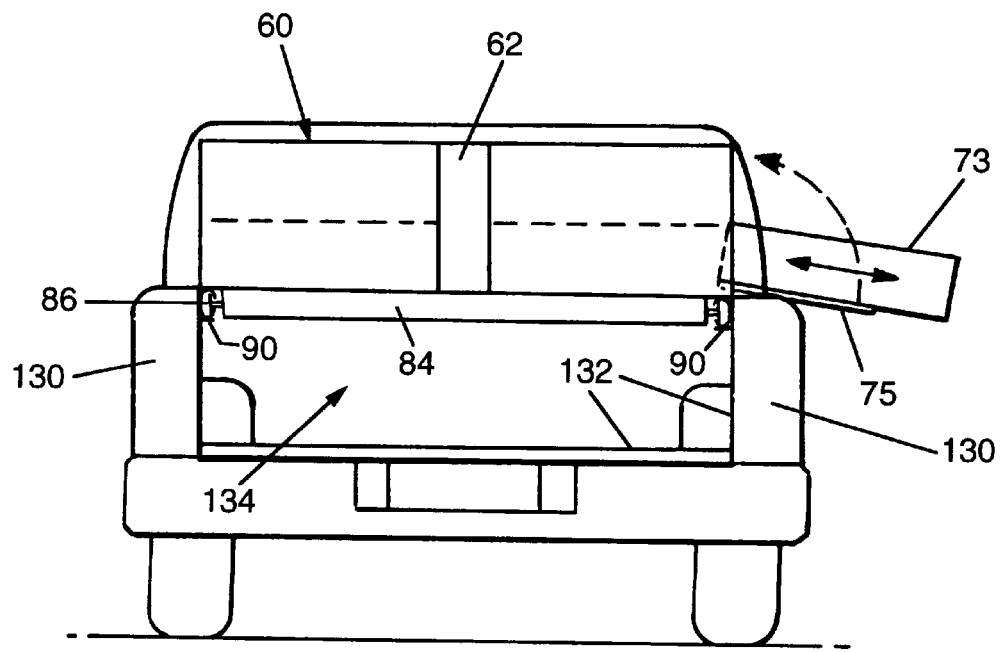
FIG. 11 is a rear view of the preferred embodiment showing a weather door dropped down in a shelf position supporting an opened container drawer as installed in a truck.

FIG. 11 depicts the relationship of the instant device with respect to the bed of a pickup truck to which it is mounted. Shown here is the modular container assembly 60 slidably mounted within pickup truck bed 130 by means of rolling elements 86 of square outer framework 84 nested within rectangular frame assembly 90. Shown herein is container drawer 73 being removed from the toolbox assembly. There is a bottom door 75 which is hinged to swing upwards to be closed in the direction indicated by the arrow. Also shown are the relationship between the open storage area of the pickup truck, the truck bed 132, and truck body portions 130.

Figure 12:
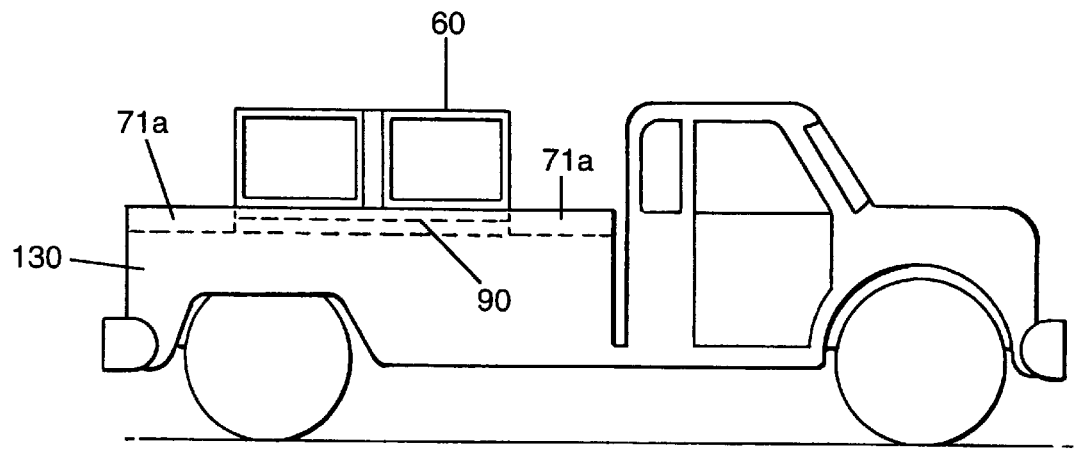
FIG. 12 is a side view of an installation on a truck showing the modular container assembly with two containers installed.

FIG. 12 is a side view of the instant invention installed on a pickup truck.

Figure 13:
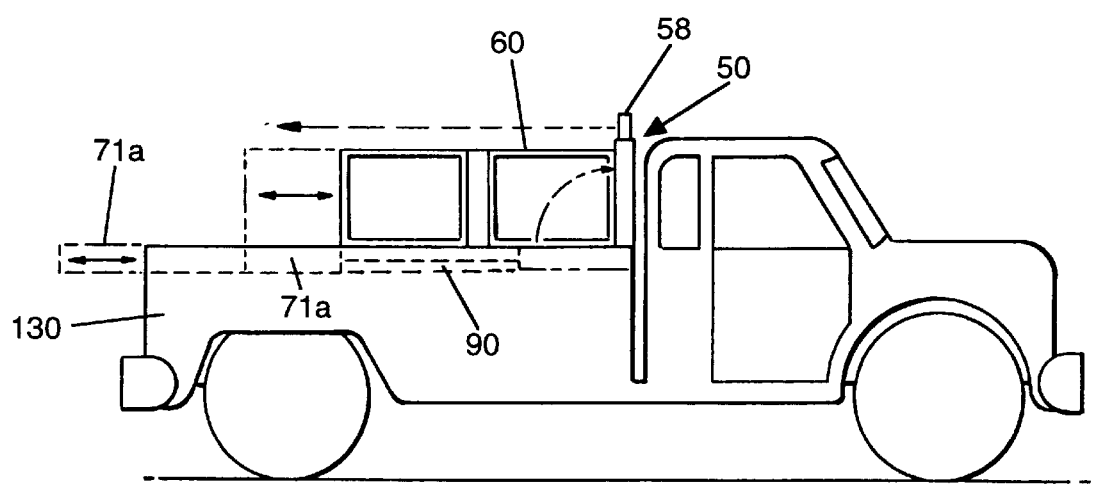
FIG. 13 is a side view of an installation on a truck showing the modular container assembly in the forward position with the swing-up guard and periscope and two containers installed.

FIG. 13 is a side view of the instant invention installed on a pickup truck showing the periscope in its extended position, thus allowing for rear-view vision capabilities, uninhibited.

Figure 14:
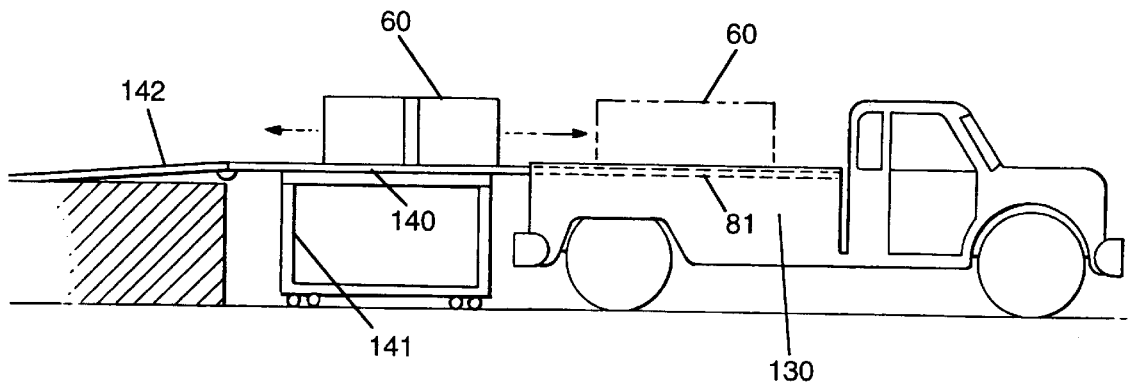
FIG. 14 is a side view showing the loading/unloading of modular container assembly using a support frame, C-track rails, and C-track ramp.

FIG. 14 shows the means by which a plurality of modular container assemblies 60 of this invention may be readily loaded and unloaded from the back of a pickup truck equipped with the instant system. In the figure shown are C-track rails 140 abutted to linear track portions 81 of the pickup truck, as well as ramp 142 having C-track rails attached to it. Also shown is movable support structure 141.

Figure 15:
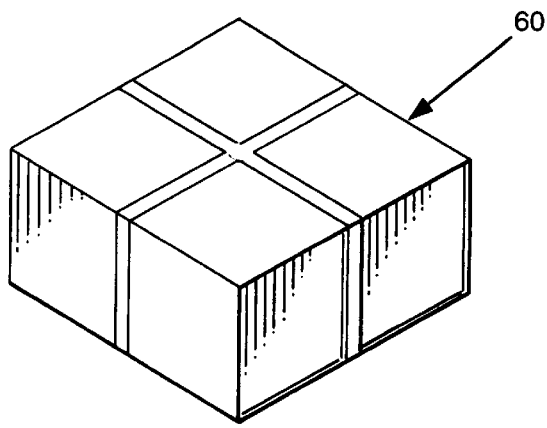
FIG. 15 is a perspective view of a modular container assembly off a truck.

FIG. 15 shows a perspective view of a container assembly.

Figure 16:
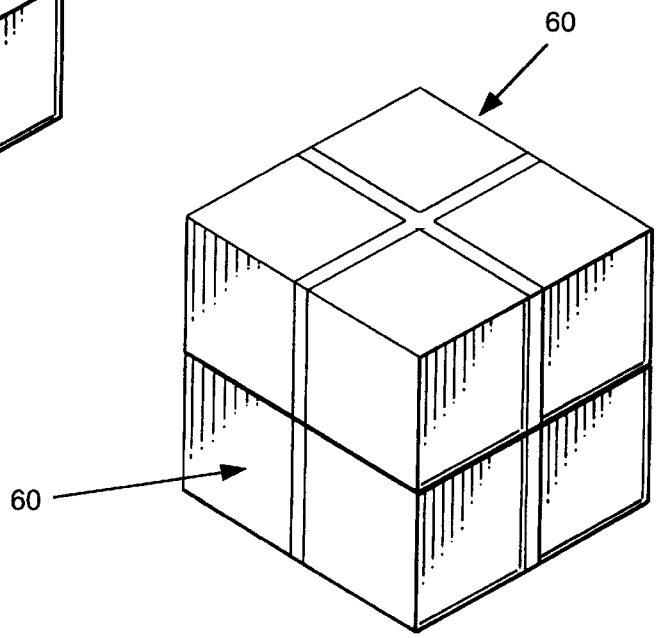
FIG. 16 is a perspective view of two containers stacked off a truck.

FIG. 16 shows a perspective view of stacked container assemblies.

Figure 17:
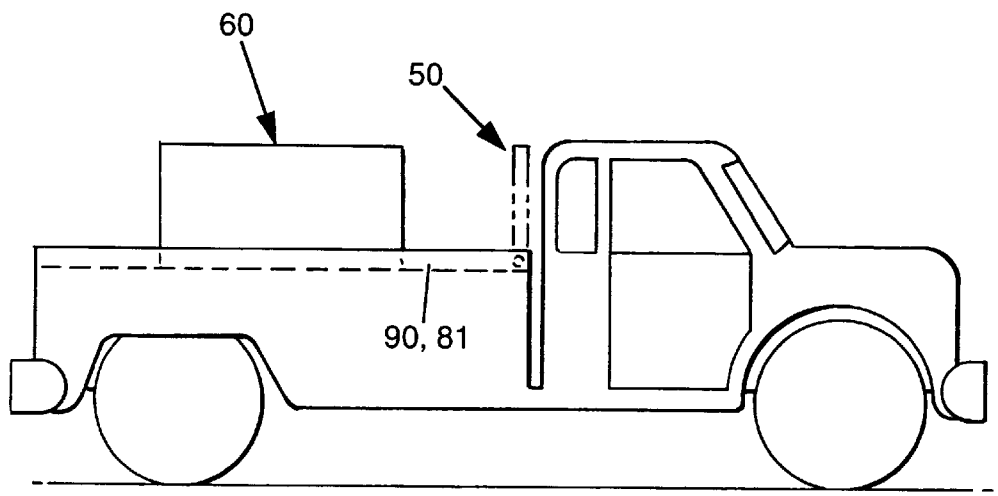
FIG. 17 is a side view of the preferred embodiment in typical traveling position.

FIG. 17 shows a preferred embodiment of this invention in position under normal travelling conditions.

Figure 18:
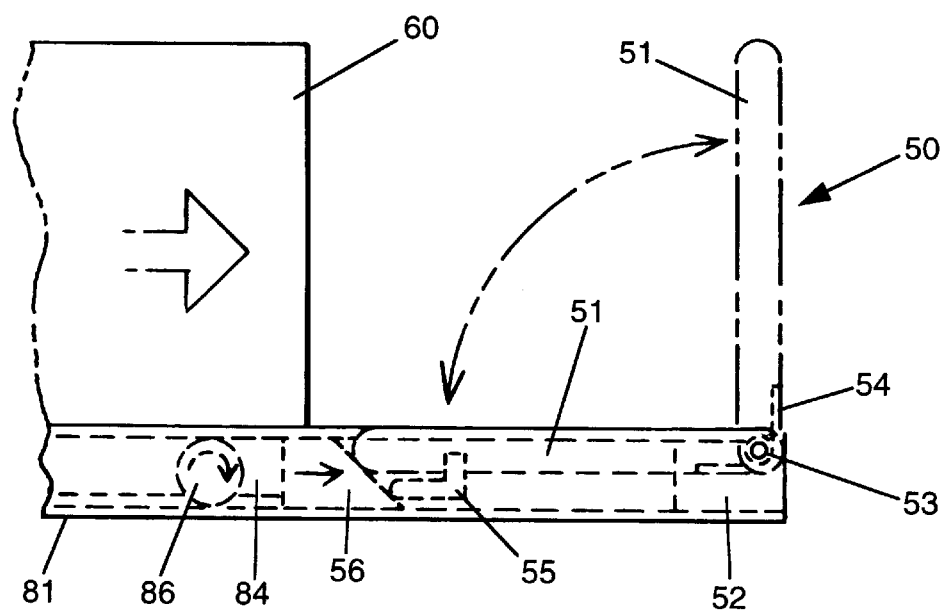
FIG. 18 is a sectional view showing the mechanism of operation of the automatic swing-up cab guard.

FIG. 18 shows a side cutaway view of the mechanism of the safety feature of this invention wherein 55 is a securing latch which under normal conditions serves to restrain frame portion 51 in a position flat with respect to the rectangular frame assembly 90. The frame portion 51 is mechanically biased by means of spring means 54 located at or near the pivot point 53 between the frame portion 51 and the insert portion 52. Under conditions of excessive inertial forces, as in the case of perhaps a collision between vehicles, the trigger means 56 is acted upon by rolling means 86. This motion causes trigger means 56 to act upon securing latch 55 so as to release frame portion 51 which then swings upward in the direction indicated by the arrow in FIG. 18, thus confining modular assembly 60 to the bed portion of the pickup truck to which the apparatus is installed. Securing latch 55 may be any latching means as is known in the art in general for securing mechanically biased elements in a stationary position, including without limitation, a hooked lever. Frame portion 51 is adapted to receive a securing latch by including a means including but not limited to a slot, groove, hook, or the like.

In one preferred form of this invention the modular container assembly 60 contains its rolling means 64 arranged in such fashion that it is capable of being slidably mounted directly to into linear track portions 81 which are affixed to the long support rails of the rectangular frame assembly. In such an embodiment, the modular container assembly is not rotatable about the z-axis as shown in FIG. 4 and the main benefits provided for include ease of interchangeability of toolboxes and the safety provisions of the cab guard assembly.

In the most preferred form of the invention, the modular container assembly 60 contains its rolling means 64 adapted to fit into the slots 83 of circular track means 80 of the rotational mount assembly 97 to provide for ease of interchangeability of toolboxes, the safety provisions of the cab guard assembly, and rotation of the modular container assembly about the z-axis shown in FIG. 4.

While the various rolling means have generally been described herein as being casters, other rolling means such as wheels, pulleys, rotors, gear mechanisms and the like are now herein indicated as having utility herein wherever one or more of the elements of this invention are slidably mounted with respect to one another, such as the rotational mount assembly within the linear track portions of the rectangular frame assembly, etc. Similarly, while although the means for receiving the rolling means have generally been described and shown herein as being essentially C-shaped in cross section, other track means such as those having other cross sectional profiles, rails, and the like are now herein indicated as having utility herein as a component of the sliding means wherever one or more of the elements of this invention are slidably mounted with respect to one another, such as the rotational mount assembly within the linear track portions of the rectangular frame assembly, etc.

To maintain the position of an element of this invention which is slidably mounted within a receiving means such as a C-shaped or other equivalent track means, stopping means are employed which consist of pins inserted into receiving holes in the track means, or metallic stops welded in place at desired locations.

Although the invention has been shown and described with respect to certain preferred embodiments, it is obvious that equivalent alterations and modifications will occur to others skilled in the art upon the reading and understand of this specification. The present invention includes all such equivalent alterations and modifications, and is limited only by the scope of the claims which now follow.

We claim:

1. A caddying apparatus for use in conjunction with various implements which comprises:

a) a rectangular frame assembly defined as comprising two parallel long support rails on its long side, and two parallel short support rails on its short side, said long support rails having portions interior and exterior to said rectangular frame assembly;

b) a pair of linear track portions having open channel portions along their length and having open ends adapted to receive at least one rolling element, said linear track portions affixed to the interior portion of each of said long parallel support rails such that the open channel portion of each of said linear track portions are facing one another;

c) a rotational mount assembly including a circular track portion having an interior portion and an exterior portion, said circular track portion having a continuous open channel on its interior portion and a plurality of slots for receiving a plurality of rolling means, said circular track portion attached to and surrounded, on a common plane, by a substantially square outer framework having inner and outer surfaces wherein said outer framework includes a plurality of rolling elements disposed on two of its opposite outer surfaces and wherein the axis of rotation of said rolling elements is essentially perpendicular to the common plane shared by the circular track portion and the square outer framework; and d) a modular container assembly comprising an upper and a lower surface wherein said lower surface is flat and has a plurality of rolling means attached thereto in such orientation to permit simultaneous insertion of said rolling means into said plurality of slots in order to confer rotational capability of said modular container assembly with respect to said rectangular frame assembly.

2. The apparatus of claim 1 further comprising a pickup truck having a cab portion and a bed portion wherein said rectangular frame assembly is attached to said bed portion of the pickup truck.

3. The apparatus of claim 1 wherein said modular container assembly comprises a toolbox.

4. The apparatus of claim 1 wherein said rolling means comprises a caster.

5. The apparatus according to claim 1 wherein said circular track portion is C-shaped in cross section.

6. The apparatus according to claim 1 wherein said linear track portions are C-shaped in cross section.

7. The apparatus according to claim 1 wherein said modular container assembly includes at least one hinged ramp.

8. The apparatus according to claim 1 wherein said modular container assembly comprises a frame which includes at least one container module removably attached thereto.

9. The apparatus according to claim 8 wherein said container module includes a locking means for securing said container module to said frame of said modular container assembly.

10. The apparatus according to claim 2 further comprising a cab guard assembly attached at the open ends of said linear track portions nearest the cab portion of said pickup truck.

11. The apparatus according to claim 10 wherein said cab guard assembly comprises:
  a) a rectangular frame portion defined as comprising two long sides, two short sides, a plurality of cross supports and a cross member;
  b) a pair of insert portions, each pivotally mounted to said rectangular frame portion at each end of one of said long sides of said rectangular portion, and adapted to fit into the ends of said linear track portions of said frame assembly;
  c) a spring means for mechanically biasing said rectangular frame portion with respect to said insert portions about said pivotal mount;
  d) securing means for securing said rectangular frame portion to said rectangular frame assembly; and
  e) a trigger means for releasing said securing means.

12. An apparatus according to claim 11 further comprising:
  f) a telescoping portion; and
  g) a hollow rectangular solid housing portion adapted to receive said telescoping portion wherein said housing portion is affixed to a crossmember attached between a plurality of cross supports of said rectangular frame portion such that the length dimension of said housing portion is substantially perpendicular to the length dimension of said rectangular frame portion.

13. The apparatus of claim 12 wherein said telescoping portion includes a periscope.

14. A process for loading or unloading a caddying apparatus from the bed of a pickup truck comprising the steps of:

A) providing a caddying apparatus for use in conjunction with various implements which comprises:
  a) a rectangular frame assembly defined as comprising two parallel long support rails on its long side, and two parallel short support rails on its short side, said long support rails having portions interior and exterior to said rectangular frame assembly;
  b) a pair of linear track portions having open channel portions along their length and having open ends adapted to receive at least one rolling element, said linear track portions affixed to the interior portion of each of said long parallel support rails such that the open channel portion of each of said linear track portions are facing one another;
  c) a rotational mount assembly including a circular track portion having an interior portion and an exterior portion, said circular track portion having a continuous open channel on its interior portion and a plurality of slots for receiving a plurality of rolling means, said circular track portion attached to and surrounded, on a common plane, by a substantially square outer framework having inner and outer surfaces wherein said outer framework includes a plurality of rolling elements disposed on two of its opposite outer surfaces and wherein the axis of rotation of said rolling elements is essentially perpendicular to the common plane shared by the circular track portion and the square outer framework; and
  d) a modular container assembly comprising an upper and a lower surface wherein said lower surface is flat and has a plurality of rolling means attached thereto in such orientation to permit simultaneous insertion of said rolling means into said plurality of slots in order to confer rotational capability of said modular container assembly with respect to said rectangular frame assembly;

B) providing a pickup truck attached to said rectangular frame portion;

C) removing said modular container assembly from said rectangular frame portion by sliding said modular container assembly completely out from said open ends of said linear track portions.

15. The process of claim 14 wherein said modular container assembly is slid into a second set of track portions after its removal from said rectangular frame portion.

* * * * *